United States Patent [19]

Card et al.

[11] Patent Number: 5,330,005
[45] Date of Patent: Jul. 19, 1994

[54] CONTROL OF PARTICULATE FLOWBACK IN SUBTERRANEAN WELLS

[75] Inventors: Roger J. Card; Paul R. Howard; Jean-Pierre Feraud, all of Tulsa, Okla.

[73] Assignee: Dowell Schlumberger Incorporated, Sugar Land, Tex.

[21] Appl. No.: 42,978

[22] Filed: Apr. 5, 1993

[51] Int. Cl.⁵ .................. E21B 33/138; E21B 43/267
[52] U.S. Cl. .............................. 166/280; 166/283; 166/292; 166/295
[58] Field of Search ............. 166/280, 278, 283, 292, 166/295

[56] References Cited

U.S. PATENT DOCUMENTS

| | | | |
|---|---|---|---|
| 2,952,318 | 9/1960 | Ritch | 166/278 |
| 3,593,798 | 7/1971 | Darley | 166/292 X |
| 3,891,565 | 6/1975 | Colpoys | 166/278 X |
| 4,109,721 | 8/1978 | Slusser | 166/280 |
| 4,623,021 | 11/1986 | Stowe | 166/278 X |
| 4,665,988 | 5/1987 | Murphy et al. | 166/295 |
| 5,222,558 | 6/1993 | Montgomery et al. | 166/278 |

*Primary Examiner*—George A. Suchfield
*Attorney, Agent, or Firm*—Stephen A. Littlefield

[57] ABSTRACT

The addition of fibrous materials in intimate mixture with particulates for fracturing and gravel packing decreases or eliminates the flowback of proppant and/or formation fines while stabilizing the sand pack and lowering the demand for high polymer loadings in the placement fluids. Preferred fibers include glass, aramide, nylon and other natural and synthetic organic and inorganic fibers and metal filaments.

22 Claims, No Drawings

CONTROL OF PARTICULATE FLOWBACK IN SUBTERRANEAN WELLS

This invention relates to the art of recovery of hydrocarbon values from subterranean formations, and more particularly, to a method and means for controlling the transport of particulate solids in conjunction with the flow of hydrocarbon fluid from the formation into a wellbore.

BACKGROUND OF THE INVENTION

Transport of particulate solids during the production of fluids from a wellbore has long presented a problem in the recovery of fluid mineral values from subterranean formations. Such transported particulate solids cannot only clog the wellbore thereby limiting or completely stopping fluid production, they represent a significant wear factor in well production equipment including pumps and seals used in the recovery process. Finally, these particulate solids must be separated from the valuable fluids adding further expense to the processing of these fluids for use.

Particulates which are available for transport in fluids flowing to the wellbore may be present due to an unconsolidated nature of the subterranean formation and/or as a result of various well treatments placing particulate solids into the formation or the near wellbore area such as by fracturing and gravel packing.

Several means have been attempted in order to limit or eliminate flowback of particulate proppant materials placed into the formation in a fracturing process. One means showing reasonable effectiveness has been to gradually release fracturing pressure once the fracturing operation has been completed so that fracture closure pressure acting against the proppant builds gradually allowing proppant matrix to stabilize before fracturing fluid flowback and well production can carry significant quantities of the proppant out of the fractures and back to the wellbore. It has also been common to use so-called "resin-coated proppant" that is particulate proppant materials having an adherent coating bonded to its outer surface so that the proppant particles are bonded to each other, a process which further reduces the possibility of proppant flowback. Since fracturing treatments may employ thousands or even millions of pounds of proppant, the use of expensive, resin-coated proppants is generally limited to use in the final stages of a fracturing treatment for economic purposes.

In unconsolidated formations, it is common to place a filtration bed of gravel in the near-wellbore area in order to present a physical barrier to the transport of unconsolidated formation fines with the production of wellbore fluids. Typically, such so-called "gravel packing operations" involve the pumping and placement of a quantity of gravel and/or sand having a mesh size between 10 and 60 U.S. Standard Sieve Series mesh into the unconsolidated formation adjacent to the wellbore. It is sometimes also desirable to bind the gravel particles together in order to form a porous matrix through which formation fluids can pass while straining out and retaining the bulk of the unconsolidated sand and/or fines transported to the near wellbore area by the formation fluids. The gravel particles may constitute a resin-coated gravel which is either pre-cured or can be cured by an overflush of a chemical binding agent once the gravel is in place. It has also been known to add various binding agents directly to an overflush of uncoated gravel particles in order to bind them together to form the porous matrix.

It has been known in the past to utilize fibrous materials in well treatment fluids in order to prevent or limit fluid loss into a porous formation or vugular zone. In this regard, glass, asbestos, cotton or cellulosic fibers have been pumped in a slurry into a wellbore or formation in order to create a mat of fibrous material over areas of high fluid loss. As the mat builds, flow of well treatment fluids into these high fluid loss areas is inhibited or prevented. Such fluid loss agents are typically pumped in conjunction with drilling fluids or in non-proppant carrying pad solutions preceding a fracturing fluid. The primary intent of using such fibrous materials in these fluids is for arresting or inhibiting fluid flow of fluids in certain desired areas of the wellbore or formation.

SUMMARY OF THE INVENTION

The present invention provides a method and fluid for treating a subterranean formation and a resultant porous solid pack which inhibits the flow of both deposited and natural formation particulates and fines back through the wellbore with the production of formation fluids.

In accordance with the invention, a method of treating a subterranean formation penetrated by a wellbore comprises the steps of providing a fluid suspension including a simultaneous mixture of particulate material and a fibrous material, pumping the fluid suspension including the mixture of the particulate material and fibrous material through the wellbore and depositing the particulate and fibrous material mixture in the subterranean formation.

Further in accordance with the invention, the above-described method comprises providing a particulate material having a size in the range of 10 to 100 mesh and a fibrous material selected from a group consisting of natural and synthetic organic fibers, glass fibers, ceramic fibers, inorganic fibers and metal fibers.

Still further in accordance with the invention, a well treatment fluid comprises a fluid suspension including a simultaneous mixture of a particulate material and a fibrous material.

Still further in accordance with the invention, a means for inhibiting particulate transport in subterranean wells comprises a porous pack including a particulate material having a size ranging from about 10 to about 100 U.S. mesh in intimate mixture with a fibrous material.

It is therefore an object of this invention to provide a means and method whereby flowback of particulate materials either pumped into a wellbore with a well treatment fluid or present as a result of unconsolidated formation fines is prevented or inhibited by the presence of fibers in an intimate mixture with a particulate material.

It is yet another object of this invention to provide a means to control the flowback of particulate material in subterranean fluid production without the use of complicated and expensive resin formulations and procedures utilizing such resins to form a porous, consolidated bed of particulates.

DETAILED DESCRIPTION OF THE PREFERRED EMBODIMENTS

These and other objects of the invention are accomplished through the manner and form of the present invention to be described hereinafter in conjunction with various examples of preferred embodiments illustrating the present invention. It will be understood that the examples presented are solely for the purpose of illustration and should not in any way be construed as a limitation of the overall concept of the invention.

In the treatment of subterranean formations, it is common to place particulate materials as a filter medium and/or a proppant in the near wellbore area and in fractures extending outwardly from the wellbore. In fracturing operations, proppant is carried into fractures created when hydraulic pressure is applied to these subterranean rock formations to a point where fractures are developed. Proppant suspended in a viscosified fracturing fluid is then carried outwardly away from the wellbore within the fractures as they are created and extended with continued pumping. Upon release of pumping pressure, the proppant materials remain in the fractures holding the separated rock faces in an open position forming a channel for flow of formation fluids back to the wellbore.

Proppant flowback is the transport of proppant sand back into the wellbore with the production of formation fluids following fracturing. This undesirable result causes undue wear on production equipment, the need for separation of solids from the produced fluids and occasionally also decreases the efficiency of the fracturing operation since the proppant does not remain within the fracture and may limit the size of the created flow channel.

Currently, the primary means for addressing the proppant flowback problem is to employ resin-coated proppants, resin consolidation of the proppant or forced closure techniques. The cost of resin-coated proppant is high, ranging form $.20 to $.40 per pound and is therefore used only as a tail-in in the last five to twenty percent of the proppant sand placement. Resin-coated proppant is not always effective since there is some difficulty in placing it uniformly within the fractures and, additionally, the resin coating can have a deleterious effect on fracture conductivity. Resin coated proppant also interacts chemically with common fracturing fluid crosslinking systems such as guar or hydroxypropylguar with organo-metallics or borate. This interaction results in altered crosslinking and/or break times for the fluids thereby affecting placement. Additionally, these chemicals can dissolve the coating on the resin-coated proppant making their use ineffective despite their high cost.

In accordance with the present invention, the difficulties of using resin-coated proppants are overcome by incorporating an amount of fibrous material in intimate mixture with conventional proppants. The fibers act to bridge across constrictions and orifices in the proppant pack and to stabilize the proppant pack with no or minimal effect on proppant conductivity. While not wishing to be limited by theory, it appears that the fibers are dispersed within the sand and, at the onset of sand production from the fracture, the fibers become concentrated into a mat or other three-dimensional framework which holds the sand in place thereby limiting further proppant flowback with the fluid production.

As used in this specification, the term "intimate mixture" will be understood to mean a substantially uniform dispersion of components in a mixture. Similarly, the term "simultaneous mixture" will be understood to mean that the mixture components are blended in the initial steps of the process.

Fiber length, thickness, density and concentration are important variables in the success of preventing proppant flowback. In accordance with the invention, the fiber length ranges upwardly from about 2 millimeters and has a diameter of from about 6 to about 200 microns. There appear to be no upper limits on the length of the fibers employed from a stabilization standpoint. However, practical limitations of handling, mixing, and pumping equipment currently limit the practical use length of the fibers to about 100 millimeters. Fibrillated fibers can also be used and the diameters of the fibrils can be significantly smaller than the aforementioned fiber diameters. The fiber level used in the proppant pack can range from 0.01% to 50% by weight of the proppant sand. More preferably, the fiber concentration ranges from 0.1% to 5.0% by weight of proppant.

The materials from which the fibers are formed is not a key variable provided that the fibers do not chemically interact with components of the fracturing fluids and are stable in the fracture environment. Thus, the fibers can be of glass, ceramic, carbon, natural or synthetic polymers or metal filaments. Glass and synthetic polymers are preferred for their low cost and relative chemical stability. The density of the fibers used is preferably greater than one gram per cc to avoid separation by flotation in the fluid/proppant slurry. Preferably, the fiber density is in the range of 1 to 4 grams per co, closely mimicking the density of the proppant materials employed.

Beyond the advantages of avoiding proppant flowback, additional advantages have been noted in the use of fibrous materials in the well treatment fluid. The presence of fibers in the fluid slows the settling rate of the solid materials in the fluid thereby permitting the use of lesser amounts of polymeric gelling material in the placement fluid. This feature offers the advantages of less cost, greater retained permeability, a need for lower concentrations of breaker and avoidance of chemical interaction with the treatment fluid components.

The fluid loss properties of the fibers are also available when fibers are incorporated into a proppant carrying fracturing fluid. In areas of high fluid loss, the fibers and sand will concentrate into a mat thereby limiting additional fluid loss in these areas.

Fibers also offer an opportunity to place well treatment chemicals in a dispersed form within the proppant pack. Thus, porous or hollow or dissolvable fibers can be filled or formed with various materials such as polymer breakers, scale inhibitors, and/or paraffin and asphaltene inhibitors which can be slowly released within the proppant pack.

The following examples will illustrate several formulations incorporating fibers. It will be understood that the presentation of these examples is solely for the purpose of illustrating the invention and should not be considered in any way a limitation on the scope or applicability of the concept of the present invention.

EXAMPLE 1 (CONTROL)

The leakoff rate of a borate-crosslinked guar fracturing fluid was determined in the following manner: A fracturing fluid was prepared from synthetic seawater containing 30 lb/1000 gal of a polymer slurry, 1.0 gal/1000 gal surfactant, 0.5 gal/1000 gal bactericide and 0.25 gal/1000 gal antifoaming agent. Approximately 2000 ml of this fluid was crosslinked with a borate crosslinking agent, poured into a large baroid cell and heated to 200 F. for 30 minutes. Using 1000 psi pressure, a fluid leakoff test was performed with a one inch sandstone core having a low permeability (0.5 millidarcy). Results are presented in Table A.

EXAMPLES 2-5

In a manner similar to example 1, the behavior of fiber/fracturing fluid mixtures were determined. All tests were performed identical to example 1 but included 2.0 g of glass fibers ($\frac{1}{8}$" long and 16 microns in diameter) that were added to the fluid prior to crosslinking. Other modifications to example 1 were:

EXAMPLE 2 contains 30 lb/1000 gal of a polymer slurry.

EXAMPLE 3 contains 25 lb/1000 gal of a polymer slurry.

EXAMPLE 4 was prepared using 2% KCl tap water, 30 lb/1000 gal polymer slurry, 1.0 gal/1000 gal surfactant, 0.5 gal/1000 gal bactericide and 0.25 gal/1000 gal antifoaming agent. No crosslinker was added to the system.

EXAMPLE 5 is identical to Example 3 but a sandstone core having a permeability of 100 millidarcy was used.

The data are presented in Table A. These data demonstrate that the fibers dramatically decrease the leakoff rate under fracturing conditions.

TABLE A

| LEAKOFF VOLUMES AS A FUNCTION OF TIME | | | | | |
|---|---|---|---|---|---|
| | EX. 1 | EX. 2 | EX. 3 | EX. 4 | EX. 5 |
| 1 min. | 0.4 ml | 0.3 ml | 0.6 ml | 0.8 ml | 6.6 ml |
| 4 min. | 1.2 ml | 0.6 ml | 0.9 ml | 1.0 ml | 7.6 ml |
| 9 min. | 2.1 ml | 0.6 ml | 1.1 ml | 1.7 ml | 8.2 ml |
| 16 min. | 2.9 ml | 0.6 ml | 1.1 ml | 2.2 ml | 8.8 ml |
| 25 min. | 3.6 ml | 0.6 ml | 1.4 ml | 2.7 ml | 9.4 ml |
| 36 min. | 4.4 ml | 0.6 ml | 1.5 ml | 3.1 ml | 10.1 ml |

EXAMPLE 6 (CONTROL)

The leakoff rate of a particulate carrying fluid was measured. The fluid contained tap water and 80 lb/1000 gal. of hydroxyethylcellulose. The particulate was a sized calcium carbonate (1-500 microns) which was added at a concentration of 0.5 lbs/gallon of fluid. Approximately 250 mls of this fluid was blended and added to a large baroid fluid loss cell preheated to 175 F. After 15 minutes, 500 psi of nitrogen pressure was applied to force the fluid against a one inch sandstone core having a permeability of 250 millidarcy. Results are presented in Table B.

EXAMPLES 7-10

The tests were repeated using glass fibers alone and in combination with the calcium carbonate particulate material. The particle loading remained constant at 0.5 lbs/gallon of fluid. The fibers were added to the fluid at the time of the calcium carbonate addition. The fiber was added as a function of weight percent of the initial calcium carbonate material.

EXAMPLE 6: 100% Calcium Carbonate; 0% Fiber.
EXAMPLE 7: 99% Calcium Carbonate; 1% Fiber.
EXAMPLE 8: 95% Calcium Carbonate; 5% Fiber.
EXAMPLE 9: 90% Calcium Carbonate; 10% Fiber.
EXAMPLE 10: 0% Calcium Carbonate; 100% Fiber.

TABLE B

| LEAKOFF VOLUMES AS A FUNCTION OF TIME | | | | | |
|---|---|---|---|---|---|
| TIME | EX. 6 | EX. 7 | EX. 8 | EX. 9 | EX. 10 |
| 0 | 0 | 0 | 0 | 0 | 0 |
| 1 min. | 110 | 87 | 76 | 171 | 30$\frac{1}{2}$ |
| 4 min. | 117 | 90 | 79 | 174 | 31 |
| 9 min. | 118 | 93 | 81 | 175 | 31$\frac{1}{2}$ |
| 16 min. | 119 | 94 | 83 | 176 | 37 |
| 25 min. | 118 | 94 | 83 | 176 | 37 |
| 36 min. | 118 | 94 | 83 | 176 | 38 |

Example 10 (fibers alone) showed no migration into the core. Particulate systems (Example 6) always show some migration into the core.

The data demonstrate superior leakoff control by the fibers. An additional advantage of fibers is no particulate migration into gravel pack or formation, therefore, less damage.

The following examples illustrate the ability of fibrillated fibers to stabilize proppant packs:

EXAMPLE 11 (CONTROL)

200 grams 20/40 mesh sand in 105 ml aqueous guar solution was poured into a 25 mm diameter glass column fitted with a bottom valve. Permeability of the pack was 380 darcies. The sand readily flowed through the $\frac{1}{4}$ inch diameter valve when it was opened.

EXAMPLE 12

In a similar manner, the Example 11 was repeated but 2 g polyacrylonitrile fibrillated fiber was mixed with the same slurry before it was poured into the column. The pack permeability was 120 darcies. The pack did not flow out when the valve was opened. It was also stable when the valve was completely removed leaving a $\frac{1}{4}$ inch diameter hole directly under the sand pack.

This illustrates the ability of fibrillated fibers to consolidate a sand pack.

EXAMPLE 13

Fibers Stabilize Sand Pack: A 30 lb/1000 gallon uncrosslinked guar solution was made. The composition of this fluid was the same as in Example 1. Fifty ml of this fluid were mixed with 0.8 grams of 12mm long, 16 micron diameter glass fibers. They were mixed with a Hamilton Beach stirrer at low speed for 15 seconds. 100 grams of 20/40 proppant sand were added to the mixture and mixed by hand in a closed 4 oz. jar by gentle shaking. The resulting mixture was poured into a vertical glass column 12 mm in diameter with a "T" section at the bottom. The left end of the "T" had a screen installed and the right end did not. First, water was flowed down the column and out the left side of the "T" to clean the guar from the sand/fiber and make a pack. The permeability of the pack was then measured. It was 278 darcies.

Next, the water flowed left to right across the "T". This washed the sand and fiber from the "T" section. The sand/fiber pack in the column section remained stable.

The water direction was then changed to flow down the column and out the right side of the "T". This created a pressure drop across the sand/fiber pack, and no screen prevented the sand from moving with the flow.

The pressure drop was increased (by increasing the flow rate) until the sand/fiber pack failed and flowed out of the vertical section of the column. The pressure drop across the sand/fiber pack required to do this was in excess of 275 kPa (40 psi). Almost none of the sand in the sand/fiber pack flowed out of the vertical section of the column until the sand pack "failed."

EXAMPLE 14

A 30 lb/1000 uncrosslinked guar solution was mixed with the proppant sand (50 ml solution with 100 grams sand) following the same procedure as in Example 13 but WITHOUT the fiber. This mixture was put into the column and the guar was cleaned out of the sand pack in the same manner as in Example 13. The permeability of the sand pack was 250 darcies. The sand pack failed under an unmeasurably low pressure.

These examples (13 and 14) illustrate that mixing fibers with the proppant sand caused the formation of a stable pack in the column. The fibers held the sand in place against a much higher force (pressure) than the sand without fibers. Also, the fibers had a negligible effect on the permeability of the sand pack.

EXAMPLE 15

Nylon Fibers: Fifty ml of a 30 lb/1000 gallon guar solution were mixed with 0.2 grams of 20 mm long, 64 micron diameter, nylon polyamide fibers. The mixing was done in a similar manner to that of Example 13. This mixture was poured into the column and tested as described in Example 13. The permeability of the sand-/fiber pack was 200 darcies. The sand/fiber pack failed at a drawdown pressure across the pack of 265 kPa.

EXAMPLE 16

Sand Pack Stabilization With High Viscosity Fluids: 1 gram of 32mm long, 16 micron diameter glass fiber was mixed with a solution of corn syrup and water having a viscosity of 600 centipoise. The mixing was done in a Hamilton Beach stirrer at low speed for 10 seconds. 100 grams of 20/40 proppant sand was then mixed with the fiber and solution. The mixture was poured into the column described in Example 13. In this case, the 600 centipoise corn syrup solution was flowed through the column. The sand/fiber pack permeability was 352 darcies. The pressure drop across the sand/fiber pack was increased with the flow direction out of the right side of the "T" (no screen). The pressure drop across the sand pack was raised to 400 kPa without pack failure.

This example illustrates that the fibers cause the sand pack to be stable even with high viscosity fluids flowing through them. High viscosity fluids flowing through the sand would occur if a guar gel was flowed back through the fracture during clean-up.

EXAMPLE 17

Settling: A 30 lb/1000 gallon guar/borate crosslinked gel was made. The composition was that of the guar solution in Example 13. 12 ram, 16 micron diameter glass fibers (0.8 weight % of sand) and 20/40 proppant sand were added to a quantity of the gel such that the sand concentration was 10 lb/gallon of gel. The sand and fiber were added to the guar solution prior the gel crosslinker solution. The fiber was added to the solution, and dispersed with a Hamilton Beach mixer. This was added to the sand in a closed jar and gently mixed by shaking. The composition of the crosslinker solution was 0.3 grams boric acid, 0.6 grams sodium hydroxide, 1.2 grams sodium gluconate, 0.5 ml triethanol amine, and 0.6 grams sodium thiosulfate for 500 ml of guar solution. The resulting mixture was placed in a heated closed column and further mixed by inverting the column once per minute. The mixture was heating to 66 degrees Celsius and the column was oriented in the vertical. The mixture ran to the bottom of the column. The settling of the sand and fiber in the guar gel were observed as a function of time at 66 degrees Celsius. Percent settling was calculated as follows:

% settling = 100 × (total height-sand height)/maximum liquid height

Total height is the height of sand plus gel liquid. Sand height is the height of the top of the sand layer. Maximum liquid height is determined with sand and water in the same amounts.

After 315 minutes the settling for the sand and fiber was 17%. There was no tendency of the sand and fibers to phase separate during the settling.

EXAMPLE 18

The experiment of Example 17 was repeated with 1.3% of the glass fiber based on the sand weight. In this case, after 260 minutes the settling was 14%.

EXAMPLE 19

The sand alone in the fluid of Example 17 settled 60% in 300 minutes. By comparison with Examples 17 and 18, this example shows that the glass fibers reduce the settling rate of the sand in the gel.

EXAMPLE 20

Interaction with Borate Gel: Six liters of a 30 lb/1000 gallon uncrosslinked guar solution were mixed with 47.6 gram of 12 mm long, 16 micron diameter glass fibers. The fiber level was based on 8 lb/gallon sand loading. No sand was added to the fiber/solution mixture. The fiber/solution mixture was allowed to sit approximately one half hour after mixing. Two fifty ml samples were removed. The fibers were filtered from one of the fifty ml samples. The Farm35 viscosity of each sample was measured at 70 degrees F. The sample with fibers had viscosities of 51 and 30 cp. at 170 and 510 sec$^{-1}$ rate respectively. The filtered sample had viscosities of 42 and 24 cp respectively. The viscosities of the filtered sample were well within specifications for this guar solution. The solution with fibers had a slightly higher viscosity.

Next borate crosslinker solution (composition in Example 17) was added to both solutions. The time to gelling was measured for both by "hang lip" methods. The filtered solution had a "hang lip" time of 4 minutes, 44 seconds. The sample with fiber had a "hang lip" time of 4 minutes 27 seconds. Both these crosslinking times are within specifications for these guar gels.

This example illustrates that the preferred glass fibers do not affect the viscosity and the "hang lip" gel times of the borate crosslinked guar gel. This illustrates that the glass fibers do not affect the guar gel chemistry or viscosity significantly.

EXAMPLE 21

Interaction With Zirconate Gel: The same mixing procedure as in Example 20 was followed with a 50 lb/1000 gallon hydroxypropyl guar solution. The 12 mm glass fibers were added to, then filtered out of one aliquot of the solution. This aliquot and another aliquot that had not been exposed to the fibers were crosslinked with a 4.5 lb/1000 gallon zirconium solution. The solution was 40% zirconium crosslinker, 24% high temperature stabilizer, and 36% water. Crosslinking hang lip times were 9:19 minutes for the sample not exposed to the fibers, and 10:13 minutes for the sample exposed to the fibers. Again, the fibers do not affect the crosslinked gel chemistry.

EXAMPLE 22

Conductivity. Conductivity testing was done with 20/40 mesh proppant. The fluid was a 30 lb/1000 gallon uncrosslinked guar solution. The composition was 17 ml of 2% KCl water, 0.12 ml guar slurry, 0.02 ml fluorocarbon surfactant, and 0.005ml defoamer. The fluid was mixed with 63 grams of 20/40 proppant. The test was done in a conductivity cell at 250 F. and 5000 psi closure stress. The conductivity after 23 hours of flowback was 157 darcies.

The test was repeated with the same quantities of fluid and proppant. In addition, 0.5 grams (0.8%) of 12 mm long, 16 micron diameter glass fibers were mixed with the proppant and fluid. The conductivity after 24 hours of flowback was 153 darcies.

This example illustrates that the fibers have a negligible effect on proppant pack permeability.

EXAMPLE 23

Slot Flow. The fiber/sand pack stability was tested in a slot geometry. 5 liters of 30 lb/1000 gallon uncrosslinked guar solution were made (34 ml guar slurry, 5 ml surfactant, and 1.25 ml defoamer and 5000 ml of tap water). This was mixed by recirculating the fluid through a holding tank and centrifuge pump for 15 minutes. 5000 grams of 20/40 sand was then added and allowed to disperse for approximately 1 minute. 50 grams of 12 mm long, 16 micron diameter glass fiber were added to the mixture. The resulting slurry was pumped into the slot.

The slot is approximately 5½ feet long, ¼" wide and 6" high. The surfaces are smooth, with the front surface being clear to allow observation. A screen was placed over the exit port so that the sand could not flow out of the slot. The slurry was pumped into the slot from the other end. In this geometry, a pack of sand and fibers built up against the screen, while the fluid was allowed to flow through the screen to a holding tank. A 6" long sand/fiber pack was built up against the screen.

The guar fluid was then washed from the pack with water. The screen was removed from the end of the slot, leaving the pack with an open ¼"×6" face. Water was flowed through the pack to test its strength. The water flow was increased until a 6 psi pressure drop was supported by the pack. At this point the pack began to fail and sand flowed out of the slot.

EXAMPLE 24

Slot Flow, Rough walls, Glass fibers: The same slurry as in Example 23 was again tested in the slot geometry. In this example, the walls of the slot were roughened. This was done by adhering a layer of 20/40 sand to the walls of the slot with rubber cement. In this geometry, a 22" sand/fiber pack was obtained and the strength of the pack exceeded 15 psi drawdown (upper limit on pump).

EXAMPLE 25

Slot With Gas Flow: A similar slurry as used in Example 23 was used in this example. In this example we used a 10 lb/1000 gallon guar solution. This slurry was pumped into the slot with rough walls and the screen as described in Example 24. The guar solution was washed from the sand/fiber pack with water. Then the pack was dried with air flowing through it for 3½ hours. The screen was removed and the test for pack strength was performed. The pack length was 18". The air flow rate was increased to 13 psi drawdown across the pack. The pack did not fail.

The pack was then further dried at low air flow rate for an additional two hours. The test was repeated. The sand/fiber pack did not fail with flow up to an 11 psi drawdown across the pack.

This example illustrates that the sand/fiber pack is resistant to gas flows as well as water flows.

EXAMPLE 26

Slot Flow With ½" aramide fibers: "KEVLAP ™" polyaramide fibers were tested in the slot geometry with rough walls. The fluid was a 20 lb/1000 gallon uncrosslinked guar solution similar to Example 23. The aramide fibers were 12 mm long and 12 microns in diameter. The slurry mixture was 4 liters of fluid, 4 kg of 20/40 proppant sand, and 12 grams of Kevlar fiber (0.3 wt. % of sand).

The sand/fiber slurry was pumped into the rough walled slot with the screen at one end as was described in Examples 23 and 24. The resulting sand pack was 14.5" long. The fluid was washed from the sand fiber pack with water. The screen was removed and the water was again flowed through the pack. The pack began to fail at 3 psi drawdown.

EXAMPLE 27

Slot Flow, 1" Nylon Fibers: We tested 1" long nylon fibers in the rough walled slot. The fibers were 64 microns in diameter. The slurry was 5 liters of 30 lb/1000 gallon uncrosslinked guar solution, 5 Kg of 20/40 proppant sand, and 15 grams of nylon fiber. The sand/fiber pack length was 6". The pack began to fail at less than 1 psi drawdown.

Examples 23–27 illustrate that fibers stabilize a proppant pack in a fracturing geometry even with smooth walls and no closure stress.

EXAMPLE 28

Slot Flow: The fiber sand pack strength was tested. A 30 lb/1000 gallon uncrosslinked guar solution with the same composition as Example 23 except that 2% KCl water was used. 20/40 proppant was added to the fluid at 12 pounds per gallon. 12 mm long, 16 micron diameter glass fibers were also added at 1% of the proppant level.

The slurry was loaded into a 5¼" by 5¼" by ¼" slot. The walls of the slot were lined with Springwall sandstone. A closure stress of 250 psi was applied. The cell was heated to 210 F. The fluid was washed from the gel with a 1% KCl solution flowing at a slow rate (50 ml/min). The brine was then washed from the cell with a saturated nitrogen gas flow. The cell was then heated to 225 F. The test was no performed with the nitrogen flow at increasing drawdown across the pack. The pack was stable at 20 psi/ft. with a closure stress ranging from 100 to 200 psi.

EXAMPLE 29

Slot Flow, NO FIBERS: The same experiment as in Example 28 was performed with proppant without fibers. At 250 psi closure stress, ¼" slot, 225 F., the proppant pack failed at less than 0.2 psi/ft.

These examples demonstrate the ability of fibers to stabilize a proppant pack under representative downhole conditions.

EXAMPLE 30

Yard Test: The glass fibers were tested in a yard test. The 12 mm long, 16 micron diameter glass fibers were added at a 1% level to the sand in a simulated fracture job. The fibers were added by hand into a fracturing fluid blender with the 20/40 proppant. This mixture was combined with the 30 lb/1000 gallon crosslinked fracturing fluid in the blender. It then flowed through a triplex pump, a tree saver, a variable choke with 1000 psi drawdown, and 300 yards of 3 inch pipe.

The pumping schedule was:
1 ppg proppant at 6 bbls/min.
1.5 ppg proppant at 6 bbls/min.
2 ppg proppant at 6 bbls/min.
3 ppg proppant at 8 bbls/min.
4 ppg proppant at 8 bbls/min.

Samples of the mixture were taken at the exit of the pipe. The glass fibers were well mixed with the proppant and fluid, although some fiber breakage was apparent.

The example demonstrates that fiber/sand slurriss can be pumped with conventional pumping equipment and that the fibers are stable enough to survive this treatment.

EXAMPLE 31

Perforation Packing: The ability of fibers to keep sand in a reservoir over a ¼" perforation was tested. A model perforation ¼" in diameter and 3" long with a 75 cubic inch reservoir at the outlet was used for the tests. The reservoir was equipped with a 20 mesh screen at the other side from the perforation. Slurry could then flow into the reservoir through the perforation and out through the screen. 4.5 L of a 20 lbm/1000 gal/hydroxyethyl cellulose (HEC) solution was prepared (135 g NH₄Cl (3 wt %), 28.3 mL HEC solution and dry caustic to raise the pH to 8). This was mixed by recirculating the fluid through a holding tank and a centrifuge pump. The fluid was hydrated for ca. 30 min. 13.5 g Aramide staple, ¼" long, was mixed in and 2,696.5 g 20/40 sand were added to the mixture (5 lbm/gal proppant, 0.5 wt % fiber based on the proppant). The resulting slurry was pumped into the reservoir through the ¼" perforation. A pack of sand and fibers built up against the screen, while the fluid was allowed to flow through the screen into the holding tank.

After packing the performation, the lines, the holding tank and the pump were cleaned and filled with water. The flow direction was reversed and water was pumped from the screen side through the packed perforation. No proppant was produced through the ¼" hole even by increasing the flow rate till a pressure drop across the pack of 15 psi was reached and kept for several minutes. The water flow was turned off and on several times. That did not produce sand either.

EXAMPLE 32

The same perforation was packed with 20/40 sand and 12 mm long, 16 micron diameter glass fiber using a 30 lbm/1000 gallon uncrosslinked guar solution. 4.5 L fluid were prepared (90 g KCl (2 wt %), 4.5 mL surfactant, 1.125 mL defoamer, 30.6 mL guar slurry) and hydrated for 30 min. 27 g glass fiber were added and after one minute 2,700 g 20/40 proppant (5 lbm/gal, 1 wt % fiber based on proppant). The packing and water flow were done as in Example 31.

The packed perforation was kept for 10 days. Within this time water was flown through it ca. 5 times, each time turning the pump on and off several times. The pack was stable and produced one teaspoon proppant at the most.

EXAMPLE 33

The same setup as in Example 31 except for a ½" perforation. This time polypropylene fibers (½" long, 4 denlet) and 30 lbm/1000 gal HEC were used.
Fluid: 4.5 L. 135 g NH₄Cl, 42.5 mL HEC solution, caustic to raise the pH to 8
Proppant: 2,696.5 g 20/40 sand (5 lbm/gal)
Fiber: 27 g polypropylene, ½" long, 4 denlet (1 wt % based on proppant)

Packing and flowing water through worked well, no sand production even over ½" hole.

Examples 31 through 33 illustrate that different types of fibers may be used to hold sand in place in the formation beyond the perforation tunnels. This is applicable to gravel packing, where gravel is placed outside of the perforations to stabilize subterranean formation sands.

EXAMPLE 34

Stabilization of Different Types of Proppant: Column experiments were performed using the fluid composition (30 lb/1000 gallon guar solution), and procedure as in Example 13. 50 ml aliquots of fluid were mixed with 100 grams each of various proppants and 1 gram (or 1.6 grams) each of 12 mm long, 16 micron diameter glass fibers. The proppants were 20/40 "CARBOLITE ™", 20/40 ACFRAC "SB ULTRA ™" curable resin coated sand, and 20/40 "ISOPAC ™" light weight gravel. The "CARBOLITE" has approximately the same density as sand, but is more spherical. The "SB ULTRA" airable resin coated sand has approximately the same density and sphericity as sand, but has a polymer coating. The "ISOPAC" lightweight gravel is much less dense than sand, is more spherical, and has a polymer coating.

The results of the column tests are shown in Table C.

TABLE C

| Strength of Various Glass Fiber/Proppant Packs | | | |
|---|---|---|---|
| Fiber Level wt. % sand | CARBOLITE | SB ULTRA | ISOPAC |
| 1% | >225 kPa | >250 kPa | 55 kPa |
| 1.6% | >250 kPa | | >250 kPa |

Examples 13 and 34 illustrate that the coating and sphericity of the proppant do not affect the ability of the fiber to strengthen the pack. Low density proppants (Isopac) may require greater amounts of fiber for pack strength.

While the invention has been described in the more limited aspects of preferred embodiments thereof, including numerous examples, other embodiments have been suggested and still others will occur to those skilled in the art upon a reading and understanding of the foregoing specification. It is intended that all such embodiments be included within the scope of this invention as limited only by the appended claims.

Having thus described our invention, we claim:

1. Method of treating a subterranean formation penetrated by a wellbore comprising the steps of providing fluid suspension including a mixture of a particulate material and a fibrous material; pumping the fluid suspension including a mixture of the particulate material and the fibrous material through the wellbore and depositing the mixture of particulate material and fibrous material in the subterranean formation.

2. The method as set forth in claim 1 wherein the step of providing comprises the step of providing a fluid suspension of a mixture of sand and a fibrous material selected from a group consisting of natural organic fibers, synthetic organic fibers, glass fibers, ceramic fibers, inorganic fibers, and metal filaments.

3. The method as set forth in claim 2 wherein the step of providing comprises the steps of providing a fluid suspension of a mixture of sand having a mesh size of 10 to 100 U.S. mesh and the selected fibrous material having a length of at least 2 mm and a diameter of about 10 to 200 microns.

4. The method as set forth in claim 3 wherein the step of providing comprises providing a mixture of sand having a 20/40 U.S. mesh size range and glass fibers having a length of 2 to 30 nun and a diameter of 10 to 100 microns.

5. The method as set forth in claim 3 wherein the step of providing comprises providing a mixture of sand and fibrous material wherein the ratio of sand to fibrous material is in the range of 0.2-1000.

6. The method as set forth in claim 3 wherein the step of providing comprises providing a mixture of sand having a 20/40 U.S. mesh size range and polyaramide fibers having a length of 2 to 30 mm and a diameter of 10 to 100 microns.

7. The method as set forth in claim 3 wherein the steps of providing comprises providing a mixture of sand and fibrous material wherein the ratio of sand to fibrous material is in the range of 0.2 to 1000.

8. The method as set forth in claim 3 wherein the step of providing comprises providing a mixture of sand having a 20/40 U.S. mesh size range and fibrillated polyaramide or polyamide fibers having a length of 2 to 30 mm and a diameter of 10 to 100 microns.

9. The method as set forth in claim 3 wherein the steps of providing comprises providing a mixture of sand an fibrous material wherein the ratio of sand to fibrous material is in the range of 0.2 to 1000.

10. The method as set forth in claim 1 wherein the step of providing a fluid suspension employs particulate materials selected from a group consisting of sand, ceramic beads, glass microspheres and synthetic organic beads having a particle size in the range of 10 to 100 U.S. mesh.

11. The method as set forth in claim 1 wherein the step of providing a fluid suspension comprises providing a fluid selected from a group consisting of gelled aqueous fluids, gelled oil, an emulsion of water and oil and a gelled aqueous/gas mixture.

12. The method as set forth in claim 11 wherein the step of providing a fluid suspension comprises providing a galactomannan gum gelled aqueous solution further including carbon dioxide, nitrogen or mixtures thereof.

13. The method as set forth in claim 1 wherein the step of pumping is carried out at a pressure in excess of fracturing pressure for the subterranean formation and the step of placing comprises placing the particulate and fiber mixture in fractures created in the formation during the step of pumping.

14. The method as set forth in claim 13 wherein the step of providing comprises the step of providing a fluid suspension of a mixture of sand and a fibrous material selected from a group consisting of natural organic fibers, synthetic organic fibers, glass fibers, ceramic fibers, inorganic fibers and metal fibers.

15. The method as set forth in claim 1 wherein the step of pumping is carried out at a pressure less than fracturing pressure for the subterranean formation and the step of placing comprises placing the particulate and fiber mixture in a near-wellbore zone.

16. In a subterranean formation penetrated by a wellbore, a porous pack comprising a particulate material having a size in the range of 10 to 100 U.S. mesh in intimate mixture with a fibrous material.

17. The porous pack as set forth in claim 16 wherein the particulate material is a fracture proppant selected from a group consisting of sand, ceramic beads, glass microspheres, synthetic organic beads and sintered minerals.

18. The porous pack as set forth in claim 16 wherein the fibrous material is selected from a group consisting of natural organic fibers, synthetic organic fibers, glass fibers, ceramic fibers., inorganic fibers and metal fibers.

19. The porous pack as set forth in claim 18 wherein the selected fibrous material has a length of at least 2 mm.

20. The porous pack as set forth in claim 19 wherein the fibrous material has a diameter ranging from about 6 microns to about 200 microns, 21. The porous pack as set forth in claim 16 wherein the pack is located adjacent the wellbore.

22. The porous pack as set forth in claim 16 wherein the pack is located in fractures extending radially outwardly from the wellbore.

* * * * *